(12) United States Patent
Otsuka et al.

(10) Patent No.: US 8,427,918 B2
(45) Date of Patent: Apr. 23, 2013

(54) OPTICAL DISK DRIVE

(75) Inventors: Yoshiyuki Otsuka, Tokyo (JP); Tatsuo Miyara, Saitama-ken (JP)

(73) Assignee: TEAC Corporation, Tama-shi, Tokyo (JP)

( * ) Notice: Subject to any disclaimer, the term of this patent is extended or adjusted under 35 U.S.C. 154(b) by 332 days.

(21) Appl. No.: 12/887,238

(22) Filed: Sep. 21, 2010

(65) Prior Publication Data
US 2011/0222386 A1 Sep. 15, 2011

(30) Foreign Application Priority Data
Mar. 11, 2010 (JP) ................ 2010-054442

(51) Int. Cl.
*G11B 20/18* (2006.01)
*G11B 5/55* (2006.01)
*G11B 20/10* (2006.01)

(52) U.S. Cl. ............... 369/53.23; 369/53.28; 369/53.29; 369/44.13; 369/44.14; 369/44.17

(58) Field of Classification Search ............... 369/44.13, 369/53.23, 53.28, 44.14, 44.17, 44.19, 53.29
See application file for complete search history.

(56) References Cited

U.S. PATENT DOCUMENTS
4,700,390 A * 10/1987 Machida ................ 704/500
2010/0215189 A1* 8/2010 Marton ................ 381/92

FOREIGN PATENT DOCUMENTS
JP 62008338 A 1/1987
JP 2000113473 A 4/2000
* cited by examiner Primary Examiner — Aneeta Yodichkas
(74) Attorney, Agent, or Firm — Seed IP Law Group PLLC (57) ABSTRACT

There is provided an optical disk drive that pursues power saving and simultaneously assures data recording quality. A servo processor of the optical disk drive has a low frequency equalizer, a high frequency equalizer, a limiter, and an adder. A limit voltage value of the limiter is set by means of a control command from a system controller. The limit voltage value is set so as to become greater during a data recording period than in a data regeneration period. An output from the adder is supplied as a tracking drive signal to a tracking actuator or as a focus drive signal to a focus actuator.

6 Claims, 7 Drawing Sheets

|  | LOW SPEED | HIGH SPEED |
|---|---|---|
| REGENERATION | L11 | L12 |
| RECORDING | L21 | L22 |

OPTICAL DISK DRIVE

This application claims priority to Japanese Patent Application No. 2010-054442, filed on Mar. 11, 2010, which is incorporated herein by reference in its entirety.

BACKGROUND

1. Technical Field

The present invention relates to an optical disk drive and, more particularly, to a tracking servo method employing a tracking error signal and a focus servo method employing a focus error signal.

2. Related Art

In relation to a tracking servo apparatus that lets; for instance, a beam spot, follow a target track, a hitherto known configuration includes supplying a tracking error signal to low frequency compensation means and high frequency compensation means, letting the low frequency compensation means make a correction to a low frequency component of the tracking error signal and the high frequency compensation means make a correction to a high frequency component of the same, adding the thus-corrected signals to each other, and supplying a resultant signal to drive means.

A disclosure provided by JP 62-8338 A includes inputting a tracking error signal into a high frequency equalizer circuit that makes a correction to a frequency characteristic of a high frequency component and also into a low frequency equalizer circuit that makes a correction to a frequency characteristic of a low frequency component and superposing the tracking error signal subjected to a low frequency correction on the tracking error signal subjected to a high frequency correction, thereby driving a tracking actuator.

Further, a disclosure provided by JP 2000-113473 A includes separating a servo filter that receives an input of a tracking error signal into high frequency compensation means and low frequency compensation means; adding together an output from the high frequency compensation means and another output from the low frequency compensation means, to thus generate a tracking drive signal; and subjecting the tracking drive signal to half wave rectification by means of a limit voltage that is generated from an average of the tracking drive signal and an offset voltage given by a d.c. power source, thereby driving a tracking actuator.

Figure 7:
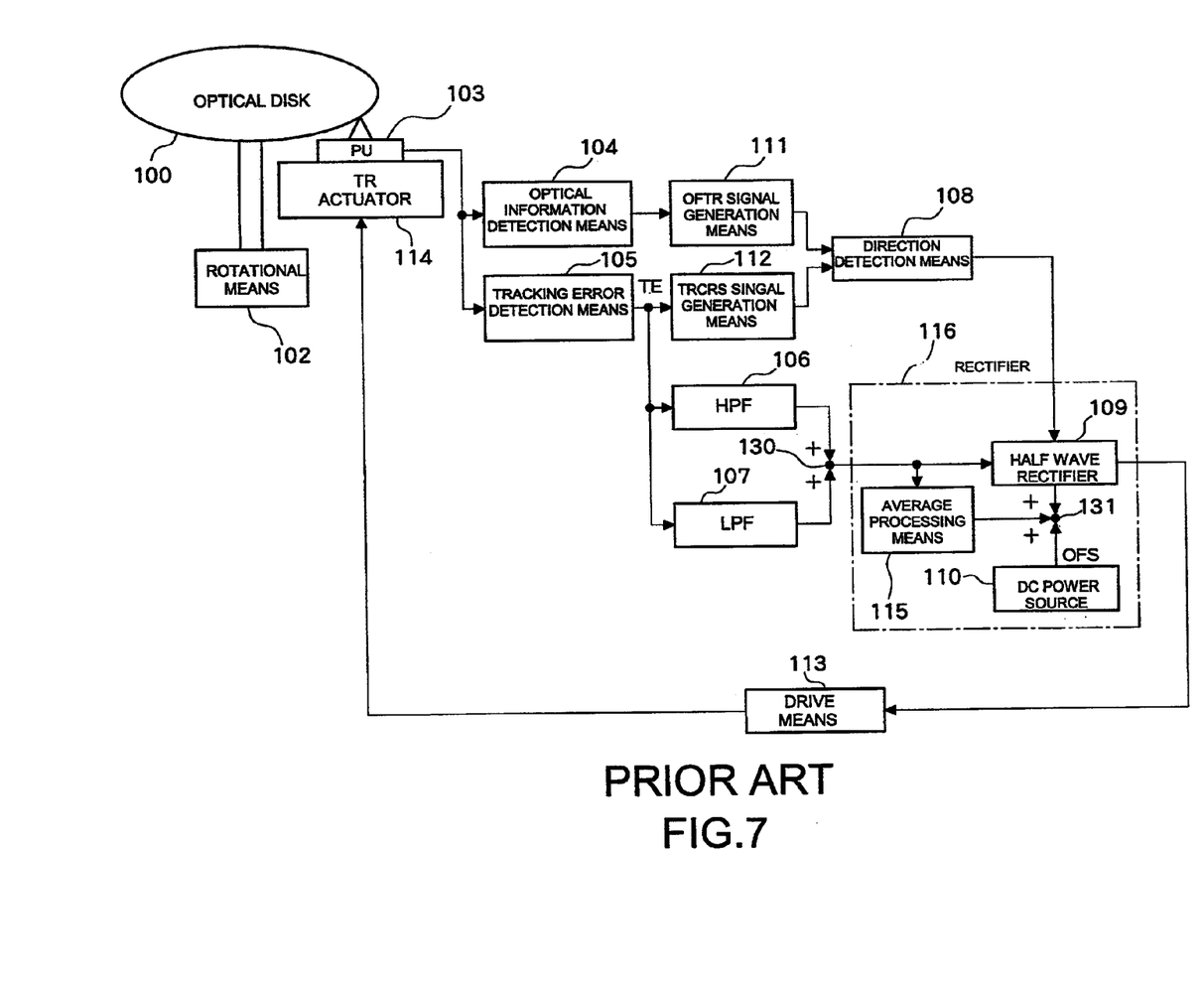
FIG. 7 is a structural block diagram of a related art optical disk drive.

FIG. 7 shows a configuration of an optical disk drive described in connection with JP 2000-113473 A. An optical disk 100 is rotationally driven by rotational means 102. A light beam originating from an optical pickup 103 is collected by an objective lens, thereby generating a light spot on the optical disk 100. The optical pickup 103 is driven by a tracking actuator 114 in a radial direction of the optical disk. Optical information detection means 104 detects information about the light beam reflected by the optical disk 100. Off-track signal generation means 111 subjects an output from the optical information detection means 104 to envelope detection, thereby binarizing the output. Tracking error detection means 105 detects a tracking error signal that is a signal commensurate with an amount of deviation between the light spot and a track center of the optical disk. Track cross signal generation means 112 binarizes a tracking error signal. Direction detection means 108 detects a direction of relative movement between the light spot and the track by means of an output from the off-track signal generation means 111 and an output from the track cross signal generation means 112.

High frequency compensation means 106 enhances a high frequency component of the tracking error signal. Low frequency compensation means 107 enhances a low frequency component of the tracking error signal. A rectifier 116 is a rectifier equipped with average value processing means 115, a half wave rectifier 109, and a DC power source 110. Drive means 113 generates drive force from a signal output from the half wave rectifier 109 and drives the tracking actuator 114.

A tracking drive signal that is a result of addition of an output from the high frequency compensation means 106 to an output from the low frequency compensation means 107 performed by an adder 130 is supplied to the half wave rectifier 109 and also to average value processing means 115. The average value processing means 115 determines an average of the tracking drive signal and outputs the low frequency component from which the high frequency component has been eliminated. The thus-output average value and an offset voltage given by the DC power source 110 are added together by the adder 131, to thus generate a limit voltage. The thus-generated limit voltage is supplied to the half wave rectifier 109. The half wave rectifier 109 receives, as inputs, an output from the direction detection means 108, the tracking drive signal, and the limit voltage generated by the adder 131; switches between polarities to be subjected to half wave rectification according to the output from the direction detection means 108; and compares the tracking drive signal with the output from the adder 131, to thus perform limit processing. Half wave rectification is thereby performed with reference to the average value of the tracking drive signal.

Limit processing of the tracking drive signal is effective as a method for reducing unwanted current consumption of the tracking actuator without involvement of a reduction in servo frequency.

However, when there is a defect in an optical disk that exceeds the limit voltage; for instance, a local surface run-out or a decenter, the servo fails to perform tracking. A residual servo track eventually becomes large, which in turn deteriorates quality of a regenerated signal during data regeneration. Therefore, it becomes necessary to retry regeneration operation by reducing the number of rotations of an optical disk.

In the meantime, when a defect, such as that mentioned above, exists in the optical disk, a retry cannot be performed during data recording operation, whereupon a write error immediately occurs. In particular, in a write once optical disk, such as a CD-R and a DVD-R, a retry of writing operation is impossible to perform; therefore, a write error immediately occurs at that point in time. This also applies to a case where a focus drive signal is subjected to limit processing.

Accordingly, there has been a desire for an optical disk drive that can pursue power saving by reducing unwanted current consumption of a tracking actuator or a focus actuator and simultaneously assure recording quality even in a data recording period.

SUMMARY

The present invention provides an optical disk drive that can pursue power saving by reducing unwanted current consumption of a tracking actuator or a focus actuator and simultaneously assure recording quality even in a data recording period.

The present invention provides an optical disk drive comprising: an optical pickup that collects a light beam on an optical disk, to thus generate a light spot; drive means that drives the light beam in a radial direction of the optical disk; detection means that detects a relative, radial positional offset between the light spot and a target track as a tracking error signal; a low frequency equalizer that makes an enhanced correction on a low frequency component of the tracking error signal; a high frequency equalizer that makes an enhanced correction on a high frequency component of the tracking error signal; a limiter that subjects an output from the high frequency equalizer to limit processing by means of a limit value; and an adder that adds together an output from the low frequency equalizer and an output from the limiter and outputs an additional result to the drive means. The limit value employed during a data recording period is set so as to become greater than a limit value employed during a data regeneration period.

The present invention also provides an optical disk drive comprising: an optical pickup that collects a light beam on an optical disk, to thus generate a light spot; drive means that drives the light beam in a planar direction of the optical disk; detection means that detects a focus offset of the light spot as a focus error signal; a low frequency equalizer that makes an enhanced correction on a low frequency component of the focus error signal; a high frequency equalizer that makes an enhanced correction on a high frequency component of the focus error signal; a limiter that subjects an output from the high frequency equalizer to limit processing by means of a limit value; and an adder that adds together an output from the low frequency equalizer and an output from the limiter and outputs an additional result to the drive means. The limit value employed during a data recording period is set so as to become greater than a limit value employed during a data regeneration period.

In one embodiment, the limit value is set so as to become greater with an increase in rotational speed of the optical disk.

The present invention further provides an optical disk drive comprising: an optical pickup that collects a light beam on an optical disk, to thus generate a light spot; drive means that drives the light beam in a radial direction of the optical disk; detection means that detects a relative, radial positional offset between the light spot and a target track as a tracking error signal; a low frequency equalizer that makes an enhanced correction on a low frequency component of the tracking error signal; a high frequency equalizer that makes an enhanced correction on a high frequency component of the tracking error signal; a limiter that subjects an output from the high frequency equalizer to limit processing by means of a limit value; a switch that selectively switches between the output from the high frequency equalizer and an output from the limiter and sends a selected output; and an adder that adds together an output from the low frequency equalizer and an output from the switch and outputs an additional result to the drive means. The switch selectively sends the output from the limiter during a data regeneration period and selectively sends the output from the high frequency equalizer during a data recording period.

The present invention also provides an optical disk drive comprising: an optical pickup that collects a light beam on an optical disk, to thus generate a light spot; drive means that drives the light beam in a planar direction of the optical disk; detection means that detects a focus offset of the light spot as a focus error signal; a low frequency equalizer that makes an enhanced correction on a low frequency component of the focus error signal; a high frequency equalizer that makes an enhanced correction on a high frequency component of the focus error signal; a limiter that subjects an output from the high frequency equalizer to limit processing by means of a limit value; a switch that selectively switches between the output from the high frequency equalizer and an output from the limiter and sends a selected output; and an adder that adds together an output from the low frequency equalizer and an output from the switch and outputs an additional result to the drive means. The switch selectively sends the output from the limiter during a data regeneration period and selectively sends the output from the high frequency equalizer during a data recording period.

The present invention makes it possible to pursue power saving by reducing unwanted current consumption of the tracking actuator or the focus actuator and simultaneously assure recording quality even in the data recording period.

The invention will be more clearly comprehended by reference to the embodiment provided below. However, the scope of the invention is not limited to the embodiment.

BRIEF DESCRIPTION OF THE DRAWINGS

A preferred embodiment of the present invention will be described in detail by reference to the following drawings, wherein.

DETAILED DESCRIPTION

An embodiment of the preset invention is now described hereunder by reference to the accompanying drawings.

Figure 1:
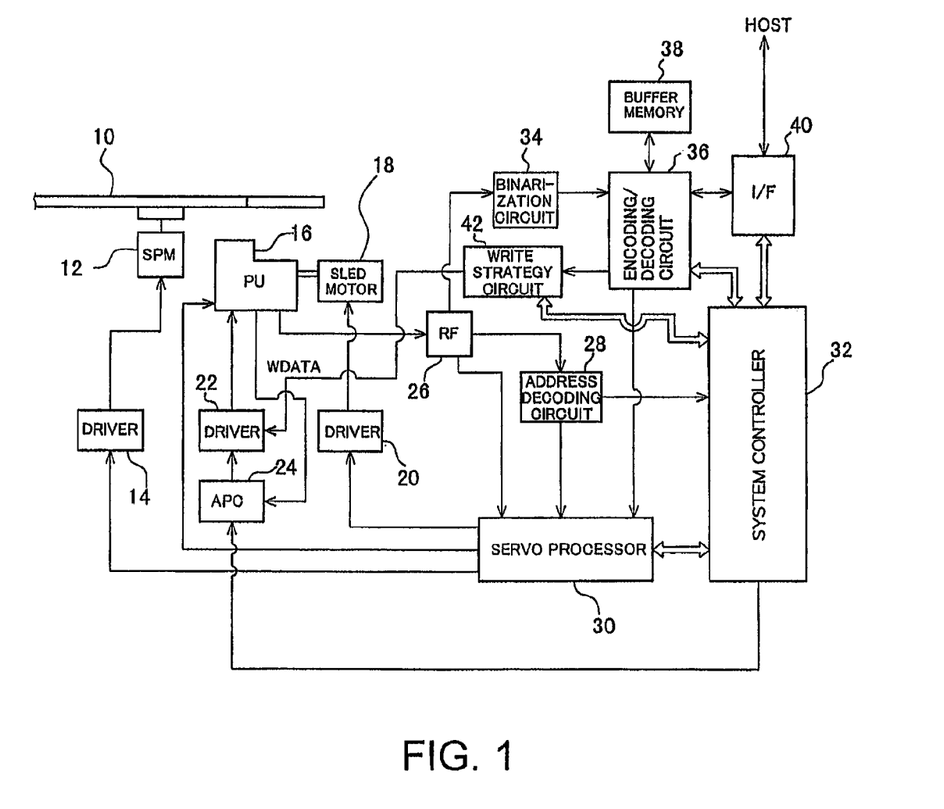
FIG. 1 is a structural block diagram of an optical disk drive.

FIG. 1 shows an overall configuration of an optical disk drive of an embodiment. An optical disk 10 capable of recording and regenerating data, such as a CD-R/RW disk, a DVD-R/RW disk, a DVD-RAM disk, and a Blu-ray disk, is driven by a spindle motor (SPM) 12. The spindle motor SPM 12 is driven by a driver 14, and the driver 14 is servo-controlled so as to achieve a desired rotational speed.

An optical pickup 16 includes a laser diode (LD) for irradiating the optical disk 10 with a laser beam and a photodetector (PD) that receives light reflected from the optical disk 10 and that converts the thus-received light into an electric signal. The optical pickup 16 is disposed opposite the optical disk 10. The optical pickup 16 is driven by a sled motor 18 made up of a stepping motor, in a radial direction of the optical disk 10. The sled motor 18 is driven by a driver 20. The optical pickup 16 is further equipped with a tracking actuator that actuates a light beam in the radial direction of the optical disk 10, and the tracking actuator is also driven by the driver. In the drawing, the driver that drives the tracking actuator is illustrated as the driver 20 for the sake of brevity; however, another driver differing from the driver 20 can also be provided. The driver 20 is servo-controlled by a servo processor 30. Moreover, the LD of the optical pickup 16 is driven by a driver 22, and the driver 22 is controlled by an automatic power control circuit (APC) 24 in such a way that a drive current comes to a desired value. The APC 24 and the driver 22 control an amount of illumination of the LD under a command from a system controller 32. In FIG. 1, the driver 22 is provided separately from the optical pickup 16. However, the driver 22 can also be provided on the optical pickup 16.

When data recorded on the optical disk 10 are regenerated, a laser beam having regeneration power from the LD of the optical pickup 16 is radiated on the optical disk 10; resultant reflected light is converted into an electric signal by the PD;

and the electric signal is output. A regenerated signal output from the optical pickup 16 is supplied to an RF circuit 26. The RF circuit 26 generates a focus error signal and a tracking error signal from the regenerated signal and supplies the signals to the servo processor 30. The servo processor 30 servo-controls the optical pickup 16 according to the error signals, thereby holding the optical pickup 16 in an on-focus state and an on-track state. Tracking servo control and focus servo control performed by the servo processor 30 will be described later. Further, the RF circuit 26 supplies an address signal included in the regenerated signal to an address decoding circuit 28. The address decoding circuit 28 demodulates address data pertaining to the optical disk 10 from the address signal and supplies the address data to the servo processor 30 and the system controller 32. The RF circuit 26 also supplies a regenerated RF signal to a binarization circuit 34. The binarization circuit 34 binarizes the regenerated signal and supplies a resultantly-generated signal to an encoding/decoding circuit 36. The encoding/decoding circuit 36 subjects the binarized signal to demodulation and error correction, thereby generating regenerated data, and outputs the regenerated data to a host, such as a personal computer, by way of an interface I/F 40. When outputting the regenerated data to the host, the encoding/decoding circuit 36 temporarily accumulates the regenerated data in buffer memory 38 and subsequently outputs the data.

On the occasion of recording of data in the optical disk 10, data to be recorded, which are delivered from the host, are supplied to the encoding/decoding circuit 36 by way of the interface I/F 40. The encoding/decoding circuit 36 stores in the buffer memory 38 the data to be recorded; encodes the data to be recorded; and supplies the encoded data to a write strategy circuit 42 as modulation data. The write strategy circuit 42 converts the modulation data into a multipulse (a pulse train) according to a predetermined recording strategy and supplies the modulation data as record data to the driver 22. Since the recording strategy affects recording quality, the recording strategy is optimized prior to data recording. The laser beam whose power has been modulated according to the record data is emitted from the LD of the optical pickup 16, whereby the data are recorded on the optical disk 10. Recording power employed during recording of data is optimized by means of test data being written for a try through OPC (Optical Power Control) and by use of a PCA (Power Calibration Area) formed along an inner radius of the optical disk 10. After having recorded the data, the optical pickup 16 radiates the laser beam having regeneration power, thereby regenerating the record data, and then supplies the regenerated data to the RF circuit 26. The RF circuit 26 supplies the regenerated signal to the binarization circuit 34, and the binarized data are supplied to the encoding/decoding circuit 36. The encoding/decoding circuit 36 decodes modulation data and verifies the thus-decoded data against the record data stored in the buffer memory 38. A verification result is supplied to the system controller 32. The system controller 32 determines whether to continually record the data or perform switching operation according to the verification result. The system controller 32 controls operation of an overall system and drives the sled motor 18 by way of the servo processor 30, to thus control the position of the optical pickup 16. In particular, in order to change operation of the servo processor 30 between a data regeneration period and a data recording period, the system controller 32 supplies a control command to the servo processor 30. More specifically, the system controller 32 controls the servo processor 30 such that the limit value of a tracking drive signal of the servo processor 30 changes between the data regeneration period and the data recording period.

First, tracking servo control is described.

Figure 2:
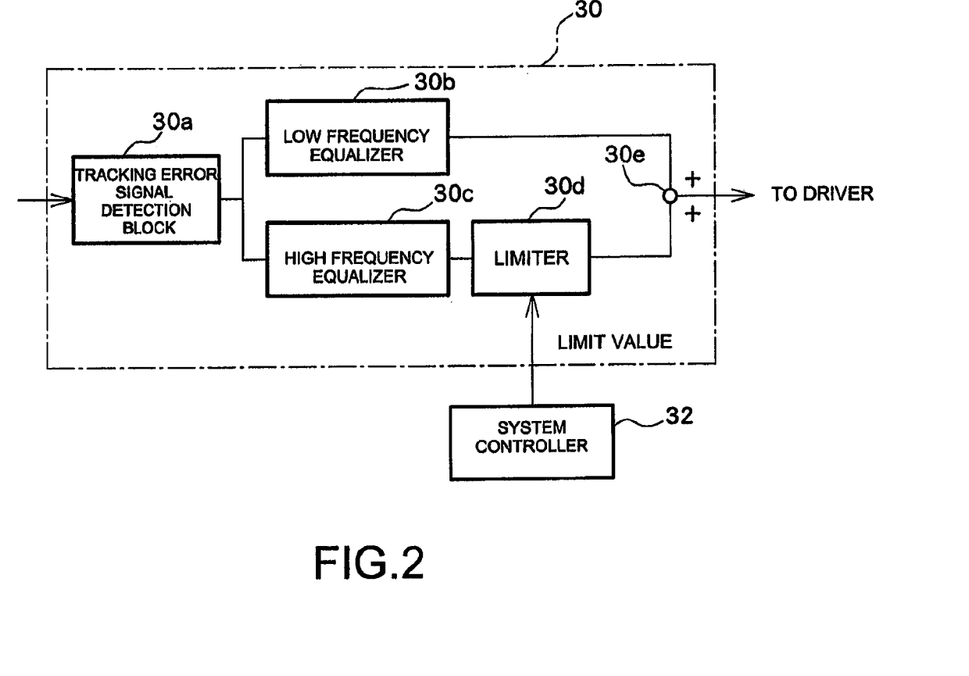
FIG. 2 is a structural block diagram (a tracking servo system) of a servo processor.

FIG. 2 shows a structural block diagram of a tracking servo system of the servo processor 30. The servo processor 30 has a tracking error signal detection block 30a, a low frequency equalizer 30b, a high frequency equalizer 30c, a limiter 30d, and an adder 30e.

The tracking error signal detection block 30a detects a relative positional offset between a light spot and a track center of a target track by means of a known method; for instance, a tri-beam method, a push-pull method, and others. The tracking error signal detection block 30a outputs the thus-detected tracking error signal to the low frequency equalizer 30b and the high frequency equalizer 30c.

The low frequency equalizer 30b makes an enhanced correction to a low frequency component in the tracking error signal, and the high frequency equalizer 30c makes an enhanced correction to a high frequency component in the tracking error signal. The low frequency equalizer 30b outputs the enhanced, corrected low frequency signal to the adder 30e. Meanwhile, the high frequency equalizer 30c outputs the enhanced, corrected high frequency signal to the limiter 30d.

The limiter 30d limits a dynamic range to perform clipping processing; namely, clip the enhanced, corrected high frequency component by use of a set limit voltage value. The limit voltage value is not a fixed value and changes between the data regeneration period and the data recording period under control of the system controller 32. Specifically, the limit voltage value employed in the limiter 30d is set in such a way that a value (an absolute value) of the limit voltage value becomes greater in the data recording period than in the data regeneration period. For instance, provided that a positive limit voltage value is L; that a limit voltage value for the data regeneration period is L(R); and that a limit voltage value for the data recording period is L(W), the system controller 32 variably controls the limit value so as to achieve a relationship of L(R)<L(W).

The reason why the limit voltage value of the limiter 30d is changed between the data regeneration period and the data recording period is as follows: Namely, the high frequency signal from the high frequency equalizer 30c is subjected to limit processing, whereby unwanted power consumption of the tracking actuator can be diminished. However, there may arise a case where the tracking servo fails to perform tracking during the data recording period, thereby deteriorating recording quality or causing a recording error. For these reasons, the high frequency component is subjected to limit processing by means of the limit voltage value L(R) during the data regeneration period. Further, during the data recording period, the limit voltage value is increased from L(R) to L(W), whereby limit processing is eased, or a servo frequency range is increased, to thus enhance tracking performance of the tracking servo. It thereby becomes possible to prevent deterioration of recording quality or occurrence of a recording error, which would otherwise arise during the data recording period. Incidentally, when the limit voltage value is increased from L(R) to L(W) during the data recording period, an amount of power consumed by the actuator increases correspondingly when compared with the amount of power consumption achieved during the data regeneration period. However, the spindle motor 12 less performs acceleration or deceleration of the optical disk 10 during the data recording period than in the data regeneration period. Further, seek operation of the optical pickup 16 is also less performed. Therefore, power consumption is not much, and an increase in power consumption attributable to an increase in limit voltage value from L(R) to L(W) does not pose any substantial problem.

As mentioned above, the limiter 30d subjects the high frequency component to limit processing by means of a different limit voltage value between during the data regeneration period and during the data recording period. The limiter 30d outputs to the adder 30e the high frequency component subjected to limit processing.

The adder 30e adds an output from the low frequency equalizer 30b to an output from the limiter 30d and outputs a result of addition as a tracking drive signal to the driver 20. As previously described, the driver 20 drives the tacking actuator, to thus actuate the light spot in the radial direction of the optical disk 10 so as to follow the track center of the target track.

In the present embodiment, the limit voltage value of the limiter 30d is changed between the data regeneration period and the data recording period. However, the limit voltage value can also be changed according to a rotational speed of the optical disk 10. Specifically, the limit voltage value is set so as to become larger as the rotational speed of the optical disk 10 increases. The reason for this is that the amount of track offset due to a surface run-out or a decenter of the optical disk 10 becomes greater with an increase in the rotational speed of the optical disk 10 and that the frequency range of the tracking servo must be made larger.

Figure 3:
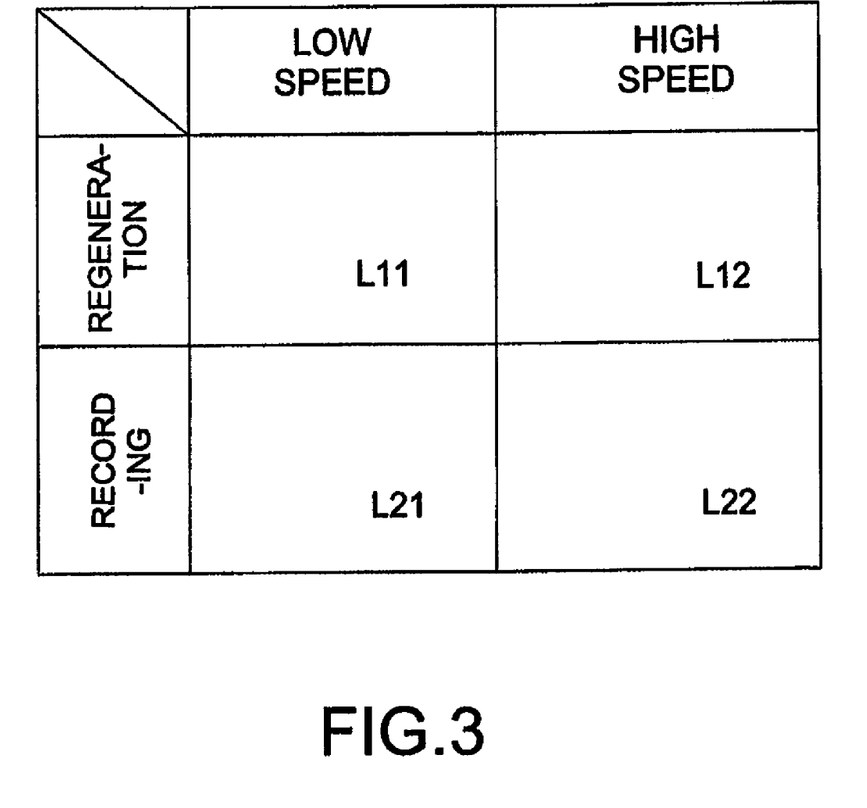
FIG. 3 is a descriptive view of settings of a limit value.

FIG. 3 shows an example method for recording and regenerating data and for setting a limit voltage value commensurate with the rotational speed of the optical disk 10. In the drawing, the rotational speed of the optical disk 10 is set between two categories; namely, a low speed and a high speed. Specifically, when the rotational speed is equal to or lower than a threshold speed when compared with the threshold speed, the speed is taken as a "low speed." On the contrary, when the rotational speed exceeds the threshold speed, the speed is taken as a "high speed." For instance, the rotational speed that is equal to or lower than a 4× speed can be taken as a low speed, whilst the rotational speed that exceeds the 4× speed can be taken as a high speed. In the drawing, when an emphasis is placed on the data regeneration period, the limit voltage value acquired when the rotational speed is a low speed is L11. When the rotational speed is a high speed, the limit voltage value is L12. Thus, a relationship of L11<L12 stands. Further, an emphasis is placed on the data recording period. When the rotational speed is a low speed, the limit voltage value is L21. When the rotational speed is a high speed, the limit voltage value is L22. There stands a relationship of L21<L22. As a matter of course, since the relationship of L(R)<L(W) exists, L11<L21 and L12<L22 are accomplished. Although a relationship existing between L12 and L21 is arbitrary, it is possible to adopt a relationship of L11<L12<L21<L22 by way of example.

Distinguishing a rotational speed shown in FIG. 3 into a low speed and a high speed is illustrative. The rotational speed can be divided into three or more categories as required. The system controller 32 previously stores a two-dimensional map or a two-dimensional table shown in FIG. 3 in memory. A limit value commensurate with a current mode (a data recording mode or a data regeneration mode) and a current rotational speed is read from the map or table, and the thus-read limit value is supplied to the limiter 30d.

In the present embodiment, the limit voltage value is changed between the data regeneration period and the data recording period. It is also possible to set the limit voltage value L(W) for the data recording period so as to become considerably larger than the limit voltage L(R) for the data regeneration period. Depending on the value of L(W), this case substantially becomes the equivalent of a case in which the limiter 30d does not perform limit processing. The present embodiment naturally encompasses such a situation. A configuration for not performing limit processing during the data recording period is now described as one example case where the limit voltage value L(W) for the data recording period is set so as to become considerably larger than the limit voltage value L(R) for the data regeneration period.

Figure 4:
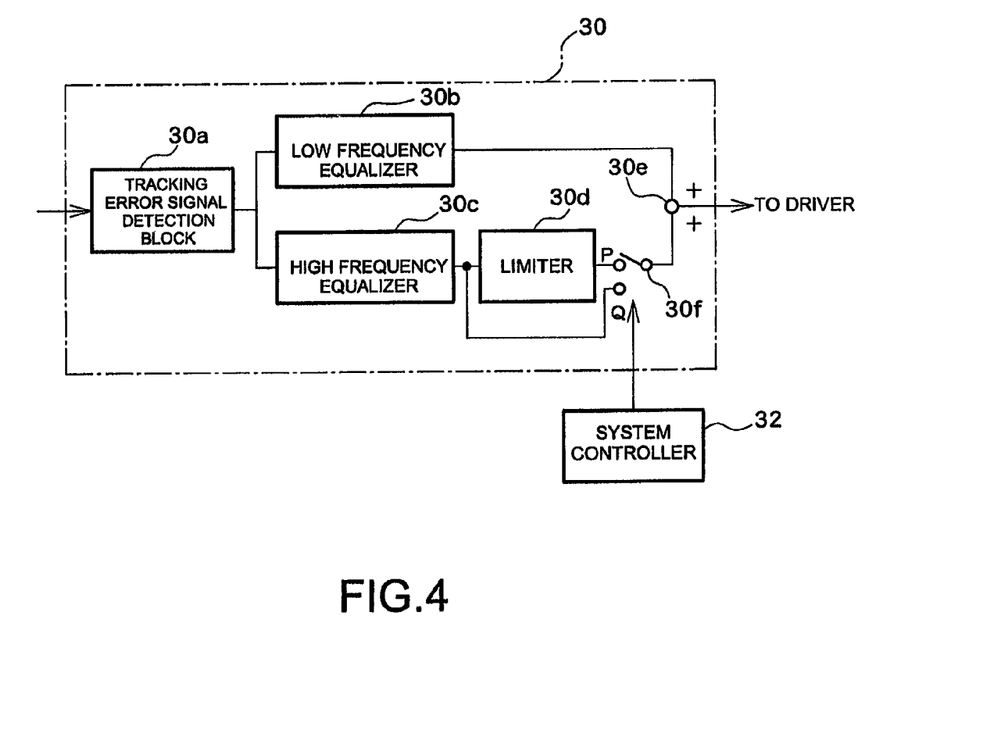
FIG. 4 is another structural block diagram (a tracking servo system) of the servo processor.

FIG. 4 shows a structural block diagram of the servo processor 30 employed in this case. The servo processor 30 has the tracking error signal detection block 30a, the low frequency equalizer 30b, the high frequency equalizer 30c, the limiter 30d, the adder 30e, and a switching circuit 30f.

The tracking error signal detection block 30a detects a relative positional offset between a light spot and a track center of a target track by means of a known method; for instance, a tri-beam method, a push-pull method, and others. The tracking error signal detection block 30a outputs the thus-detected tracking error signal to the low frequency equalizer 30b and the high frequency equalizer 30c.

The low frequency equalizer 30b makes an enhanced correction to a low frequency component in the tracking error signal, and the high frequency equalizer 30c makes an enhanced correction to a high frequency component in the tracking error signal. The low frequency equalizer 30b outputs the enhanced, corrected low frequency signal to the adder 30e. Meanwhile, the high frequency equalizer 30c outputs the enhanced, corrected high frequency signal to the limiter 30d. The limiter 30d subjects the high frequency component to limit processing by means of a predetermined limit value and outputs the processed high frequency component to the switching circuit 30f. Further, the high frequency equalizer 30c sends an output to the switching circuit 30f by means of bypassing the limiter 30d; in other words, the high frequency equalizer outputs a high frequency component not subjected to limit processing to the switching circuit 30f.

The switching circuit 30f is a switching circuit having a contact point P and a contact point Q and toggles between the contact point P and the contact point Q in response to a control command from the system controller 32. The contact point P outputs a high frequency component having undergone limit processing in the limiter 30d, whilst the contact point Q outputs a high frequency component that has bypassed the limiter 30d and that has not undergone limit processing. The system controller 32 switches the contact point of the switching circuit 30f to the contact point P during the data regeneration period and switches the contact point of the switching circuit 30f to the contact point Q during the data recording period. Accordingly, the switching circuit 30f outputs to the adder 30e, the high frequency component subjected to limit processing during the data regeneration period and the high frequency component not subjected to limit processing during the data recording period. As mentioned above, the low frequency component is superposed on the high frequency component not subjected to limit processing during the data recording period, to thus generate a tracking drive signal. The thus-generated tracking drive signal is supplied to the driver 20. The configuration shown in FIG. 4 is the equivalent of the configuration shown in FIG. 2 in which the limit voltage value L(W) employed for the data recording period is set to an infinity.

In the configuration shown in FIG. 4, the limit voltage value employed during the data regeneration period can also be changed according to the rotational speed of the optical disk 10. Specifically, the limit voltage value of the limiter 30d is changed by the control command value from the system controller 32 and set so as to become greater with an increase in rotational speed. This equates to setting the limit voltage values L21 and L22 employed for the data recording period in the map or table shown in FIG. 3 to an infinity.

Focus servo control is now described.

Figure 5:
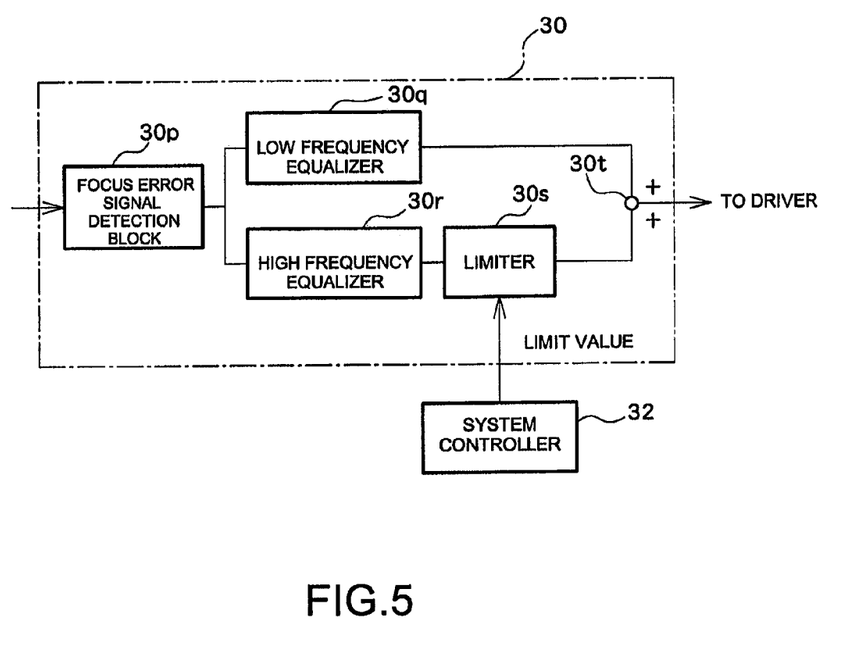
FIG. 5 is a structural block diagram (a focus servo system) of the servo processor.

FIG. 5 shows a structural block diagram of a focus servo system in the servo processor 30. The servo processor 30 has a focus error signal detection block 30p, a low frequency equalizer 30q, a high frequency equalizer 30r, a limiter 30s, and an adder 30t.

The focus error signal detection block 30p detects a focus offset of a light spot by means of a known method. The focus error signal detection block 30p outputs the thus-detected focus error signal to the low frequency equalizer 30q and the high frequency equalizer 30r.

The low frequency equalizer 30q makes an enhanced correction to a low frequency component in the focus error signal, and the high frequency equalizer 30r makes an enhanced correction to a high frequency component in the focus error signal. The low frequency equalizer 30q outputs the enhanced, corrected low frequency signal to the adder 30t. Meanwhile, the high frequency equalizer 30r outputs the enhanced, corrected high frequency signal to the limiter 30s.

The limiter 30s limits a dynamic range to perform clipping processing; namely, clip the enhanced, corrected high frequency component by use of a set limit voltage value. The limit voltage value includes a positive limit voltage value and a negative limit voltage value. A configuration of the clip circuit is known. The limit voltage value in the embodiment is not a fixed value and changes between the data regeneration period and the data recording period under control of the system controller 32. Specifically, the limit voltage value employed in the limiter 30s is set in such a way that a value (an absolute value) of the limit voltage value becomes greater in the data recording period than in the data regeneration period. For instance, provided that a positive limit voltage value is L; that a limit voltage value for the data regeneration period is L(R); and that a limit voltage value for the data recording period is L(W), the system controller 32 variably controls the limit value so as to achieve a relationship of L(R)<L(W). The limiter 30s outputs to the adder 30t the high frequency component subjected to limit processing.

The adder 30t adds an output from the low frequency equalizer 30q to an output from the limiter 30s and outputs an addition result as a focus drive signal to the driver 20. The driver 20 drives the focus actuator, to thus drive the light spot in a planar direction of the optical disk 10 and let the light spot follow a focus position.

Figure 6:
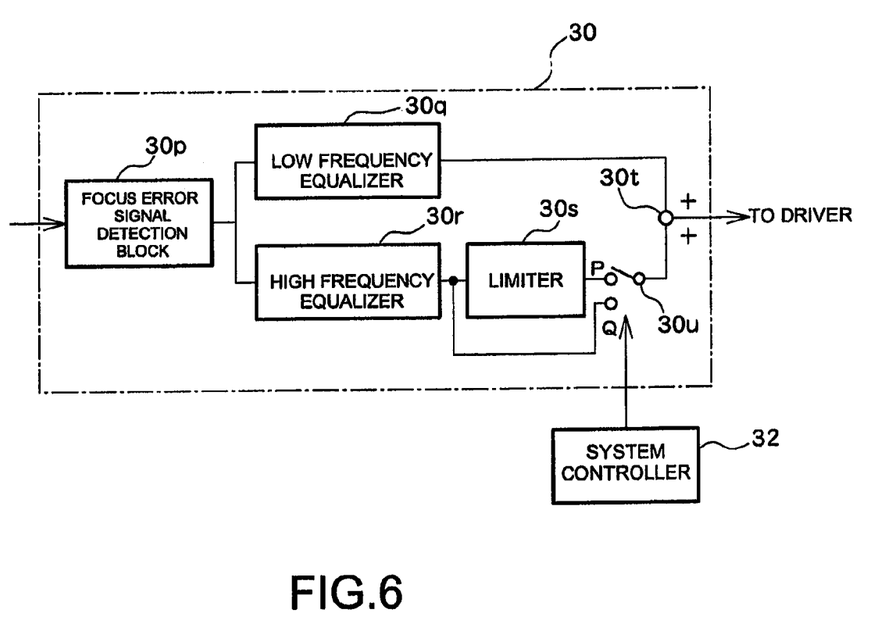
FIG. 6 is still another structural block diagram (a focus servo system) of the servo processor.

FIG. 6 shows another structural block diagram of a focus servo system. The servo processor 30 has the focus error signal detection block 30p, the low frequency equalizer 30q, the high frequency equalizer 30r, the limiter 30s, the adder 30t, and a switching circuit 30u.

The focus error signal detection block 30p detects a focus offset by means of the known method. The focus error signal detection block 30p outputs the detected focus error signal to the low frequency equalizer 30p and the high frequency equalizer 30r.

The low frequency equalizer 30q makes an enhanced correction to a low frequency component in the focus error signal, and the high frequency equalizer 30r makes an enhanced correction to a high frequency component in the focus error signal. The low frequency equalizer 30q outputs the enhanced, corrected low frequency signal to the adder 30t. Meanwhile, the high frequency equalizer 30r outputs the enhanced, corrected high frequency signal to the limiter 30s. The limiter 30s subjects a high frequency component to limit processing by means of a predetermined limit value. Further, the high frequency equalizer 30r outputs a high frequency component to the switch circuit 30u by means of bypassing the limiter 30s; namely, outputs a high frequency component not subjected to limit processing to the switch circuit 30u.

The switching circuit 30u is a switching circuit having a contact point P and a contact point Q and toggles between the contact point P and the contact point Q in response to a control command from the system controller 32. The contact point P outputs a high frequency component having undergone limit processing in the limiter 30s, whilst the contact point Q outputs a high frequency component that has bypassed the limiter 30s and that has not undergone limit processing. The system controller 32 switches the contact point of the switching circuit 30u to the contact point P during the data regeneration period and switches the contact point of the switching circuit 30u to the contact point Q during the data recording period. Accordingly, the switching circuit 30u outputs to the adder 30t, the high frequency component subjected to limit processing during the data regeneration period and the high frequency component not subjected to limit processing during the data recording period. As mentioned above, the low frequency component is superposed on the high frequency component not subjected to limit processing during the data recording period, to thus generate a focus drive signal. The thus-generated focus drive signal is supplied to the driver 20.

In the configuration shown in FIG. 6, the limit voltage value employed during the data regeneration period can also be changed according to the rotational speed of the optical disk 10. Specifically, the limit voltage value of the limiter 30s is changed by means of a control command value from the system controller 32 and set so as to become greater with an increase in rotational speed.

As mentioned above, in the present embodiment, the limit voltage value of the limiters 30d and 30s is changed between the data regeneration period and the data recording period, thereby setting the limit voltage value employed during the data recording period so as to become greater than the limit voltage value employed during the data regeneration period (including a case where limit processing is not performed during the data recording period). Hence, it becomes possible to simultaneously reduce power consumption and assure data recording quality.

In the present embodiment, the data recording period includes a period during which data are written in a trial manner at the time of performance of OPC. Specifically, even when OPC is performed, the limit voltage value is set so as to become greater than the limit voltage value employed during the data regeneration period.

Further, when the optical disk 10 is a rewritable optical disk, a retry of writing operation is possible. Hence, the limit voltage value is made equal to the limit voltage value employed during the data regeneration period at the time of the first data recording period. It is also possible to set the limit voltage value to a larger value during the retry period.

In the present embodiment, the limit voltage value is changed between the data regeneration period and the data recording period. There is also provided a case where the limit voltage value is changed according to the rotational speed of the optical disk 10. Simply changing the limit voltage value according to the rotational speed of the optical disk 10 is also possible as simpler processing. Specifically, it is also possible to increase the limit voltage value, regardless of the data regeneration period or the data recoding period, with an increase in rotational speed. The essential requirement for the system controller 32 in this case is to set the limit voltage value according to the rotational speed, regardless of the data regeneration period or the data recording period, by use of only the map or table show in FIG. 3.

Moreover, the present embodiment has provided the configuration of the tracking servo system and the configuration of the focus servo system. However, both the tracking servo system and the focus servo system in the servo processor 30 may also assume the configuration shown in FIGS. 2 through 6. In this case, both unwanted power consumption of the tracking actuator and unwanted power consumption of the focus actuator can be reduced.

What is claimed is:

1. An optical disk drive comprising:
   an optical pickup that collects a light beam on an optical disk, to thus generate a light spot;
   drive means that drives the light beam in a radial direction of the optical disk;
   detection means that detects a relative, radial positional offset between the light spot and a target track as a tracking error signal;
   a low frequency equalizer that makes an enhanced correction on a low frequency component of the tracking error signal;
   a high frequency equalizer that makes an enhanced correction on a high frequency component of the tracking error signal;
   a limiter that subjects an output from the high frequency equalizer to limit processing by means of a limit value; and
   an adder that adds together an output from the low frequency equalizer and an output from the limiter and outputs an additional result to the drive means, wherein
   the limit value employed during a data recording period is set so as to become greater than a limit value employed during a data regeneration period.

2. The optical disk drive according to claim 1, wherein the limit value is set so as to become greater with an increase in rotational speed of the optical disk.

3. An optical disk drive comprising:
   an optical pickup that collects a light beam on an optical disk, to thus generate a light spot;
   drive means that drives the light beam in a planar direction of the optical disk;
   detection means that detects a focus offset of the light spot as a focus error signal;
   a low frequency equalizer that makes an enhanced correction on a low frequency component of the focus error signal;
   a high frequency equalizer that makes an enhanced correction on a high frequency component of the focus error signal;
   a limiter that subjects an output from the high frequency equalizer to limit processing by means of a limit value; and
   an adder that adds together an output from the low frequency equalizer and an output from the limiter and outputs an additional result to the drive means, wherein
   the limit value employed during a data recording period is set so as to become greater than a limit value employed during a data regeneration period.

4. The optical disk drive according to claim 3, wherein the limit value is set so as to become greater with an increase in rotational speed of the optical disk.

5. An optical disk drive comprising:
   an optical pickup that collects a light beam on an optical disk, to thus generate a light spot;
   drive means that drives the light beam in a radial direction of the optical disk;
   detection means that detects a relative, radial positional offset between the light spot and a target track as a tracking error signal;
   a low frequency equalizer that makes an enhanced correction on a low frequency component of the tracking error signal;
   a high frequency equalizer that makes an enhanced correction on a high frequency component of the tracking error signal;
   a limiter that subjects an output from the high frequency equalizer to limit processing by means of a limit value
   a switch that selectively switches between the output from the high frequency equalizer and an output from the limiter and sends a selected output; and
   an adder that adds together an output from the low frequency equalizer and an output from the switch and outputs an additional result to the drive means, wherein
   the switch selectively sends the output from the limiter during a data regeneration period and selectively sends the output from the high frequency equalizer during a data recording period.

6. An optical disk drive comprising:
   an optical pickup that collects a light beam on an optical disk, to thus generate a light spot;
   drive means that drives the light beam in a planar direction of the optical disk;
   detection means that detects a focus offset of the light spot as a focus error signal;
   a low frequency equalizer that makes an enhanced correction on a low frequency component of the focus error signal;
   a high frequency equalizer that makes an enhanced correction on a high frequency component of the focus error signal;
   a limiter that subjects an output from the high frequency equalizer to limit processing by means of a limit value;
   a switch that selectively switches between the output from the high frequency equalizer and an output from the limiter and sends a selected output; and
   an adder that adds together an output from the low frequency equalizer and an output from the switch and outputs an additional result to the drive means, wherein
   the switch selectively sends the output from the limiter during a data regeneration period and selectively sends the output from the high frequency equalizer during a data recording period.

* * * * *